United States Patent
Koloc

[11] 3,927,323
[45] Dec. 16, 1975

[54] VIDEO PHOSPHOR MOTION PERCEPTION DISPLAY

[75] Inventor: Paul M. Koloc, College Park, Md.

[73] Assignee: The United States of America as represented by the Secretary of the Navy, Washington, D.C.

[22] Filed: Sept. 20, 1973

[21] Appl. No.: 399,029

[52] U.S. Cl. .................... 250/329; 250/330
[51] Int. Cl. ............................ G11b 7/04
[58] Field of Search ........... 250/329, 330, 333, 334

[56] References Cited
UNITED STATES PATENTS

| 2,402,761 | 6/1946 | Leverenz ................ 250/329 X |
| 3,438,022 | 4/1969 | Teeg et al. ................ 250/329 X |
| 3,676,677 | 7/1972 | Condas et al. ................ 250/330 |
| 3,802,879 | 4/1974 | Ovshinsky et al. ................ 250/334 |

Primary Examiner—Archie R. Borchelt

[57] ABSTRACT

A moving target indicator for illuminating only those objects in motion. The invention consists of a phosphorous excitation source such as a defocused electron beam or ultraviolet light synchronized with a focused $CO_2$ or similar laser for producing a thermal raster. By modulating the laser with image information, only the time changing intensities (moving objects) produce a visible phosphorescent image since only changing thermal temperature image patterns produce visible images.

7 Claims, 2 Drawing Figures

VIDEO PHOSPHOR MOTION PERCEPTION DISPLAY

BACKGROUND OF THE INVENTION

The present invention pertains generally to radio wave communications and more specifically to systems for distinguishing moving objects. Enhancement of moving targets is normally carried out by expensive electronic processing of time sequential signals used to form a display. These prior systems have used electronic processing involving memory elements and complex coupling techniques. The most common movement distinguishing system is the radar moving target indicator (MTI) which includes electronic cancelling circuits for eliminating successive radar pulses having the same phase.

Conventional canceller circuits include at least one canceller stage. A canceller stage has a signal input terminal and a subtractor circuit which provides a cancelled output. A first input terminal of the subtractor circuit is directly coupled to the signal input terminal, and a delay line is coupled between the signal input terminal and a second input of the subtractor circuit. The delay period of the delay line must be equal to the time between successive pulses. Thus, if echo pulses are received from a stationary target, the successive reflected pulses cancel each other and a zero output is provided.

Since the canceller stage has only one delay line, the output has only a first order cancellation. The order of cancellation may be increased by cascading a plurality of canceller stages to provide a significant improvement in rejection of signals returned from a stationary background other than the target, commonly known as clutter.

This requires the use of at least another delay line, which may present several disadvantages. In both typical surveillance and typical airborne attack radar, analog delay lines are quite expensive, costing several thousands of dollars. Also, in airborne attack radar, both size and weight of a radar system are critical considerations, and the use of a plurality of delay lines increases both the size and the weight of the system.

Electronic disadvantages are also present. Where a plurality of delay lines are utilized in analog embodiments, complicated circuitry must be utilized to regulate the delay periods of both delay lines to assure that they both produce the same delay time. Further, the possibility of differing temperature stability of the delay lines may lead to different delay periods and hence lead to inaccuracy in the output signal. Thus, it is extremely desirable to provide a higher order of cancellation than that which is produced by a conventional canceller stage while not relying on the complex, bulky, expensive and unreliable apparatus of the conventional systems.

SUMMARY OF THE INVENTION

The present invention overcomes the disadvantages and limitations of the prior art by providing a video phosphor motion perception display. The display consists of a defocused electron beam or ultraviolet light used as an excitation source. Synchronized with this source is a focused $CO_2$ or similar laser which produces a thermal raster. Since only changing thermal patterns produce contrasting images on the screen, by modulating the laser with image information, only the time changing images (moving objects) are visible.

It is therefore the object of the present invention to provide an improved system for displaying moving objects.

It is also the object of the present invention to provide an inexpensive system for displaying moving objects.

Another object of the invention is to provide a simple convenient and compact device for displaying moving objects.

Another object of the invention is to provide a reliable system for displaying moving objects.

Other objects, advantages and novel features of the invention will become apparent from the following detailed description of the invention when considered in conjunction with the accompanying drawings wherein:

DETAILED DESCRIPTION OF THE PREFERRED EMBODIMENT

Figure 1:
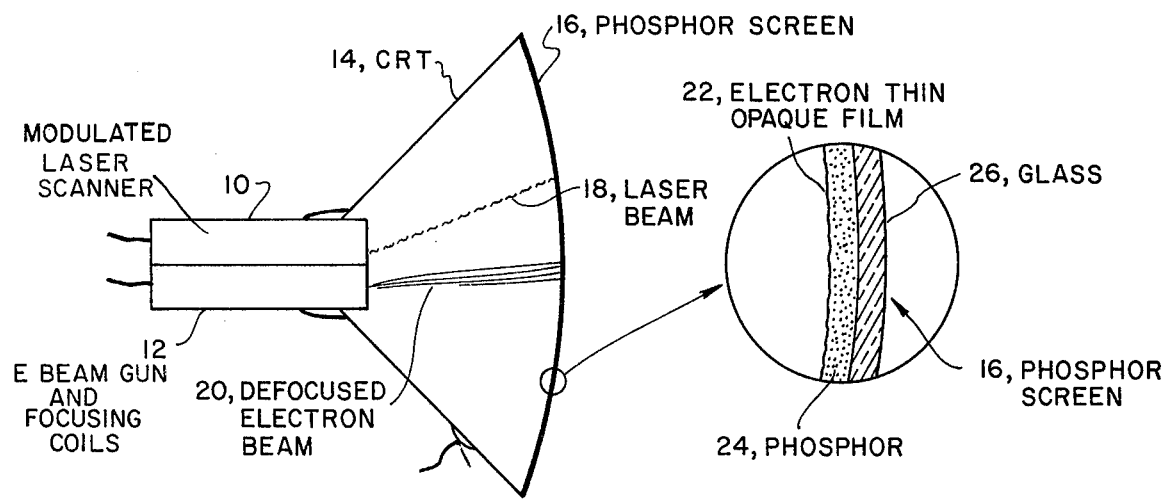
FIG. 1 shows the preferred embodiment of the present invention using an electron beam as an excitation source.

FIG. 1 is a diagram of a phosphor moving target indicator comprising the preferred embodiment. Phosphors 24 are initially excited by a rapidly scanning defocused electron beam 20 produced by an electron beam gun 12. Laser scanner 10 produces a focused laser beam 18 which forms a thermal raster on the phosphor screen 16. A thermal picture is in turn produced by synchronizing the laser raster to conform with the raster of the electron beam and modulating the laser beam with image information normally impressed on the scanning electron beam 20. However, if the image information is repeated, i.e., if the picture contains no areas with time changing intensities, the thermal image will not produce a visible phosphorescent image except for the initial transient. Yet, if an object moves through the camera field, the phosphor screen will contain a changing thermal image pattern corresponding to the motion of the object. This is due to the population state of the phosphors as explained below.

If a phosphor is continuously activated by a source such as a low intensity ultraviolet lamp or a defocused electron beam, population trapping increases until the rates of decay equals the rate of excitation. In general, the relaxation time of a phosphor depends on temperature. For example, suppose a phosphor has an ambient temperature of $t_1$ and is excited under the conditions outlined above. When the phosphor reaches equilibrium, its population $N_1$ is stored in the excited state. If the temperature of the phosphor is raised to $t_2$, the relaxation time of the phosphor will decrease. Consequently, with a constant excitation C, the population of the excited state will decrease to $N_2$.

The excitation rate C equals the quotient of the population by the relaxation time $\tau$ after equilibrium.

$$C = N_1/\tau_1 = N_2/\tau_2$$

The energy contained in the phosphor $E_2$ at temperature $t_2$ will be proportionally less than $E_1$. During the transient time, as the phosphor is heating, it will emit both the equilibrium radiation and the stored energy difference between thermal states (1) and (2). This will momentarily produce a more intense glow on an area of the phosphor screen heated to $t_2$ than on the surrounding area $t_1$. After equilibrium is reached, the phosphor's light intensity I will be nearly identical.

I(transient) = C + $E_1$ − $E_2$/(Heating Time)

By reversing the process and allowing the phosphor to cool from $t_2$ to $t_1$, the radiation emitted during the transient will be the remainder of the equilibrium intensity less the energy difference between thermal states 1 and 2. Thus the glow intensity I from the area of the phosphor screen being cooled will decrease temporarily.

I(transient) = C − ($E_1$ − $E_2$) (cooling time).

This phenomenon may be utilized to produce a display device which has significant military application. As presently conceived, the device would be compatible with any image sensing device such as radar, FLIR, or television type systems.

In the conventional cathode ray display mode the total image is displayed. In the display mode we are considering, only objects in motion would be seen on the screen. This is the "motion perception" mode or MP mode.

In the conventional television display stationary objects such as buildings, parked automobiles, stress, etc., have as much or more contrast than objects in motion such as people, moving cars, or birds in flight. In the MP display mode, stationary objects are suppressed. Only those objects in motion have contrast.

For perimeter defense, this device would be useful from the human factor standpoint. The system could eliminate much of the mental fatigue and human error associated with discriminating between moving and stationary objects. This is especially true when the terrain is cluttered with debris, jungle, rocks, or a congestion of man-made objects.

In the MP mode, the electron beam 20 is defocused to illuminates the whole phosphor by penetrating the thin opaque film 22. The image information is then impressed on the laser beam 18, which is scanning the phosphor 24 and impressing a thermal image on the phosphor 24. Only if the beam is visible would the opaque film 22 be necessary. If a $CO_2$ 10.6 micron beam laser were used the phosphor could be thermalized directly.

Thus, by coupling this device to the information processing field which utilizes optical transform techniques, time dependent motion in the transform can be emphasized, perhaps reducing information storage. This denotes that in a very real sense this system acts like a memory in that it compares the current thermal picture with an average of recent ones. The difference is registered as a gain or loss of intensity relative to the ambient equilibrium glow. Furthermore, if we consider a bright object moving across the scene, the leading edge will be bright and the trailing edge dark. This gives the direction of motion and may give some notion of the velocity. The faster the object moves, the wider the separation of the leading and trailing edge.

Figure 2:
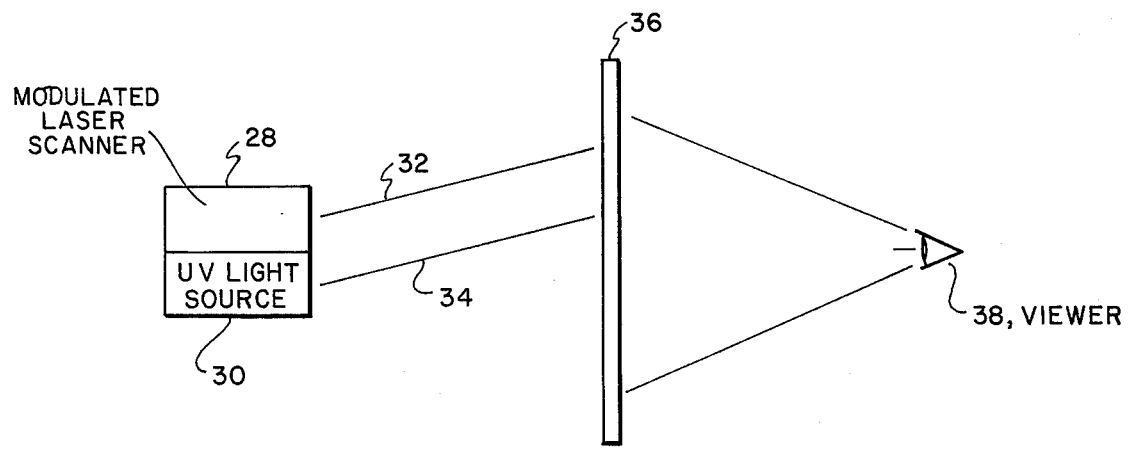
FIG. 2 shows the preferred embodiment using an ultraviolet light as an excitation source.

An alternative structure for displaying the MP mode is shown in FIG. 2. This device uses an ultraviolet light source to produce the required constant phosphor stimulation rate. Again, the picture is supplied by the laser. A vacuum tube is not needed since the electron beam is not being used. In addition, the size and shape of the screen could be adapted for different applications.

Obviously many modifications and variations of the present invention are possible in light of the above teachings. For example, by suitable arrangement the device of FIG. 1 could operate in either the conventional or MP mode. For conventional mode, the laser beam if off or blank while the electron beam is modulated with image information and focused as a conventional television picture tube. This reduces the need for two separate screens without loss of utility.

Other applications may be possible. Certain information processing techniques utilize optical transforms, and it may be that motion in the transform could be of interest. Images of jumping laser modes become very discernable, due to the suppression of static mode images. It is therefore to be understood that within the scope of the appended claims the invention may be practiced otherwise than as specifically described.

I claim:

1. A method of displaying moving objects in a stationary scene on a phosphorous screen comprising the steps of:
   exciting said phosphorous screen at a constant excitation rate;
   modulating a thermal laser source with image information of said scene;
   scanning said thermal laser source across said phosphorous screen to impress a thermal image of said scene on said phosphorous screen to cause varying thermal states and thereby varying intensities on phosphors corresponding to moving objects.

2. A device for displaying both a stationary and moving object in a scene under a first mode of operation and only moving objects in said scene under a second mode of operation comprising:
   a phosphorous layer deposited on a glass plate to form a phosphorous screen;
   means for producing a focussed electron beam in said first mode of operation and a defocussed electron beam in said second mode of operation which is scanned across said phosphorous screen; and,
   means for producing a laser beam which is modulated with image information and scanned synchronously with said means for producing a defocussed electron beam, said means for producing a laser beam being activated only during said second mode of operation for impressing a thermal image of said scene on said phosphorous screen such that the thermal state of said phosphorous screen is continually changing for moving objects in said scene causing said screen to emit an image of only said moving objects.

3. A device for displaying only moving objects in a scene comprising:
   a phosphorous layer deposited on a glass plate to form a phosphorous screen;
   ultraviolet source means for stimulating said phosphorous screen at a constant excitation rate;
   means for producing a laser beam which is modulated with image information and scanned across said phosphorous screen to impress a thermal image of said scene on said phosphorous screen such that the thermal state of said phosphorous screen is continually changing for moving objects in said scene causing said screen to emit an image of only said moving objects.

4. The device of claim 2 wherein said phosphorous layer is covered with a thin opaque film.

5. The device of claim 2 wherein said means for producing a laser beam comprises a $CO_2$ infrared laser for directly thermalizing said phosphorous screen.

6. The device of claim 3 wherein said phosphorous layer is covered with a thin opaque film.

7. The device of claim 3 wherein said means for producing a laser beam comprises a $CO_2$ infrared laser for directly thermalizing said phosphorous screen.

* * * * *